US010487975B2

(12) United States Patent
Smith

(10) Patent No.: US 10,487,975 B2
(45) Date of Patent: Nov. 26, 2019

(54) ROTATIONAL COUPLING DEVICE

(71) Applicant: Bradley Ray Smith, Midland, TX (US)

(72) Inventor: Bradley Ray Smith, Midland, TX (US)

( * ) Notice: Subject to any disclaimer, the term of this patent is extended or adjusted under 35 U.S.C. 154(b) by 161 days.

(21) Appl. No.: 15/846,681

(22) Filed: Dec. 19, 2017

(65) Prior Publication Data

US 2018/0172202 A1   Jun. 21, 2018

Related U.S. Application Data

(60) Provisional application No. 62/437,173, filed on Dec. 21, 2016.

(51) Int. Cl.
*F16M 11/18*   (2006.01)
*B66C 23/48*   (2006.01)
(Continued)

(52) U.S. Cl.
CPC .......... *F16M 11/18* (2013.01); *F16H 57/025* (2013.01); *F16M 3/00* (2013.01); *F16M 11/42* (2013.01);
(Continued)

(58) Field of Classification Search
CPC ...... F16M 11/18; F16M 11/10; F16M 11/105; F16M 3/00; F16M 11/42; B25H 1/0007; F16H 57/025; F16H 1/28; F16H 2057/02069; F16H 2057/0075; B66C 23/485; B25B 11/02; B66F 1/00; B66F 3/00; B66F 5/00; B66F 9/00
USPC ............ 248/130, 218.4, 219.3, 219.4, 230.1; 269/17, 61; 475/3; 74/491; 254/134, 254/47; 24/277
See application file for complete search history.

(56) References Cited

U.S. PATENT DOCUMENTS 1,127,969 A * 2/1915 Dolder ................. B23Q 1/5437
                                                    269/61
1,812,585 A * 6/1931 Collins ................ B25H 1/0007
                                                    269/59
(Continued)

OTHER PUBLICATIONS

Rotator for Engine Stand; by H.A.M.B.; Sep. 12, 2012; https://www.jalopyjournal.com/forum/threads/rotator-for-engine-stand.734137/ (Year: 2012).*
(Continued)

*Primary Examiner* — Ingrid M Weinhold
(74) *Attorney, Agent, or Firm* — Patentfile, LLC; Bradley C. Fach; Steven R. Kick

(57) ABSTRACT

A rotational coupling device may include a housing which may be coupled to a stationary coupler. The stationary coupler may be used to engage or couple the device to a machinery stand. A motivator shaft may be positioned on one side of the housing and a rotational drive shaft may be positioned on the other side of the housing. The motivator shaft and the rotational drive shaft may be operably connected together with a gear arrangement with rotation of the motivator shaft resulting in rotation of the rotational drive shaft that is of a reduced rate compared to the motivator shaft. The rotational drive shaft may be coupled or connected to the rotational assembly via a rotational coupler thereby allowing rotational motion provided by the motivator shaft to be transferred through the rotational drive shaft to the rotational assembly of the machinery stand to which the device is engaged.

7 Claims, 7 Drawing Sheets

(51) Int. Cl.
  *B25H 1/00* (2006.01)
  *F16M 11/42* (2006.01)
  *F16M 3/00* (2006.01)
  *F16H 57/025* (2012.01)
  *F16H 1/28* (2006.01)
  *F16H 57/02* (2012.01)

(52) U.S. Cl.
  CPC .......... *B25H 1/0007* (2013.01); *B66C 23/485* (2013.01); *F16H 1/28* (2013.01); *F16H 2057/02069* (2013.01)

(56) References Cited

U.S. PATENT DOCUMENTS

| | | | | |
|---|---|---|---|---|
| 2,340,707 A * | 2/1944 | Staley | ................. | B25H 1/0007 74/425 |
| 3,063,706 A * | 11/1962 | Thurstone | ............ | B25H 1/0007 269/61 |
| 3,172,653 A * | 3/1965 | Fredrickson | ......... | B25H 1/0007 269/61 |
| 3,212,770 A * | 10/1965 | Stephens | .............. | B25H 1/0007 269/61 |
| 3,218,056 A * | 11/1965 | Kaplan | ................ | B25H 1/0007 269/61 |
| 3,664,624 A * | 5/1972 | Freegard | .............. | A47B 96/061 248/218.4 |
| 4,020,715 A * | 5/1977 | Sollars | ...................... | F16H 1/16 74/606 R |
| 4,239,196 A * | 12/1980 | Hanger | ................ | B25H 1/0007 269/17 |
| 4,533,127 A * | 8/1985 | Hawkins | ................. | B66C 23/48 269/17 |
| 4,705,264 A * | 11/1987 | Hawkins | ............... | B66C 23/485 269/17 |
| D324,599 S * | 3/1992 | Bailey | ........................... | D34/31 |
| 5,165,632 A * | 11/1992 | Kuan | ................... | B25H 1/0007 248/129 |
| 5,692,989 A * | 12/1997 | Kamlukin | ................. | F16H 1/28 475/338 |
| 5,816,116 A * | 10/1998 | Antony | ................ | F16H 57/025 74/606 R |
| 6,106,189 A * | 8/2000 | Seale | .................... | F16B 7/0493 248/230.3 |
| 6,318,699 B1 * | 11/2001 | Williams | .............. | B25H 1/0007 248/129 |
| 6,431,535 B1 * | 8/2002 | Volpe | .................. | B25H 1/0007 269/47 |
| 6,491,293 B1 * | 12/2002 | Brewer | .................. | B25B 11/02 269/17 |
| 6,581,887 B2 * | 6/2003 | Lapidez | ............... | F16M 11/048 248/122.1 |
| 6,581,920 B1 * | 6/2003 | Smith | .................. | B25H 1/0007 254/134 |
| 6,619,640 B1 * | 9/2003 | Ploski | ...................... | B23Q 1/52 269/17 |
| 6,663,313 B2 * | 12/2003 | Lewis | ..................... | F16D 1/096 403/369 |
| 7,093,809 B2 * | 8/2006 | Hwang | ................ | B25H 1/0007 248/127 |
| 7,163,207 B2 * | 1/2007 | Baird | ....................... | B60P 1/56 254/419 |
| 7,175,170 B2 * | 2/2007 | Kincaid | ............... | B25H 1/0007 269/17 |
| 2002/0090258 A1 * | 7/2002 | Lewis | ..................... | F16D 1/096 403/374.3 |
| 2003/0062663 A1 * | 4/2003 | Fox | ...................... | B25H 1/0007 269/17 |
| 2005/0274867 A1 * | 12/2005 | Kincaid | ............... | B25H 1/0007 248/664 |
| 2013/0252781 A1 * | 9/2013 | Hagedorn | ................ | F16H 1/46 475/337 |
| 2014/0077140 A1 * | 3/2014 | Baird | ....................... | B60S 9/08 254/419 |
| 2014/0371028 A1 * | 12/2014 | Billmeyer | ................ | F16H 1/46 475/337 |
| 2019/0086024 A1 * | 3/2019 | Milekovic | ............ | B25H 1/0007 |

OTHER PUBLICATIONS

Engine Stand; by John Niolon; Jul. 5, 2011; https://jniolon.classicpickup.com/enginestand/BDES.html (Year: 2011).*

* cited by examiner

ROTATIONAL COUPLING DEVICE

CROSS REFERENCE TO RELATED APPLICATIONS

This application claims priority to and the benefit of the filing date of U.S. Provisional Application No. 62/437,173, filed on Dec. 21, 2016, entitled "ROTATIONAL COUPLING DEVICE", which is hereby incorporated by reference in its entirety.

FIELD OF THE INVENTION

This patent specification relates to the field of orientation adjustable object support devices. More specifically, this patent specification relates to device which may be used to adjust the orientation of objects, such as machinery, which are coupled thereto.

BACKGROUND

Many objects are of a size, weight, and shape that make it difficult to access the entirety of the objects. This is especially true of large machinery, such as vehicle engines, transmissions, generators, and the like, and work pieces, such as sculptures, large artwork, and other projects. While these objects may be supported by stands which are able to rotatably couple an object to the stand, the rotational mechanism can require the use of large amounts of torque in order to effect rotation. Unfortunately, some users may not have the musculature to effect rotation, other users may cause the object and stand to fall over due to an unsteady application of torque. To address this problem, some object support stands incorporate one or more large handles which seek to provide a user with greater leverage and control over the rotation of an object secured to the stand. However, the improvement provided by these stands is incremental as most users still find these stands hard and/or dangerous to operate.

Therefore a need exists for novel orientation adjustable object support devices. There is also a need for novel devices which may be used to adjust the orientation of large and heavy objects, such as machinery, which are coupled thereto with currently available stands. A further need exists, for novel rotational coupling devices for objects which do not require the use of large amounts of torque in order to effect rotation. Finally, a need exists for novel rotational coupling devices for objects which are able to prevent an unsteady application of torque which may cause the object and stand to fall over.

BRIEF SUMMARY OF THE INVENTION

A rotational coupling device is provided which may be engaged to a machinery stand having a rotational assembly coupled to a frame member to facilitate the ability of a user to rotate the head plate of the machinery stand and therefore to rotate an object coupled to the head plate. In some embodiments, the device may include a housing which may be coupled to a stationary coupler. The stationary coupler may be used to engage or couple the device to the machinery stand. A motivator shaft may be positioned on one side of the housing and a rotational drive shaft may be positioned on the other side of the housing. The motivator shaft and the rotational drive shaft may be operably connected together with a gear arrangement, which may be contained within the housing, with rotation of the motivator shaft resulting in rotation of the rotational drive shaft. The gear arrangement may be configured as a speed reducing arrangement so that the rotational drive shaft rotates with a slower rate of rotation than the motivator shaft. The rotational drive shaft may be coupled or connected to the rotational assembly via a rotational coupler thereby allowing rotational motion provided by the motivator shaft to be transferred through the rotational drive shaft to the rotational assembly of a machinery stand to which the device is engaged.

In further embodiments, the stationary coupler may include a first brace arm and a second brace arm, and the first brace arm may engage a first surface of the frame member while the second brace arm may engage an opposing second surface of the frame member of the machinery stand.

In still further embodiments, the rotational coupler may be rotationally engaged to the rotational assembly of the machinery stand by inserting a portion of the rotational coupler through a portion of the rotational assembly.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Figure 1:
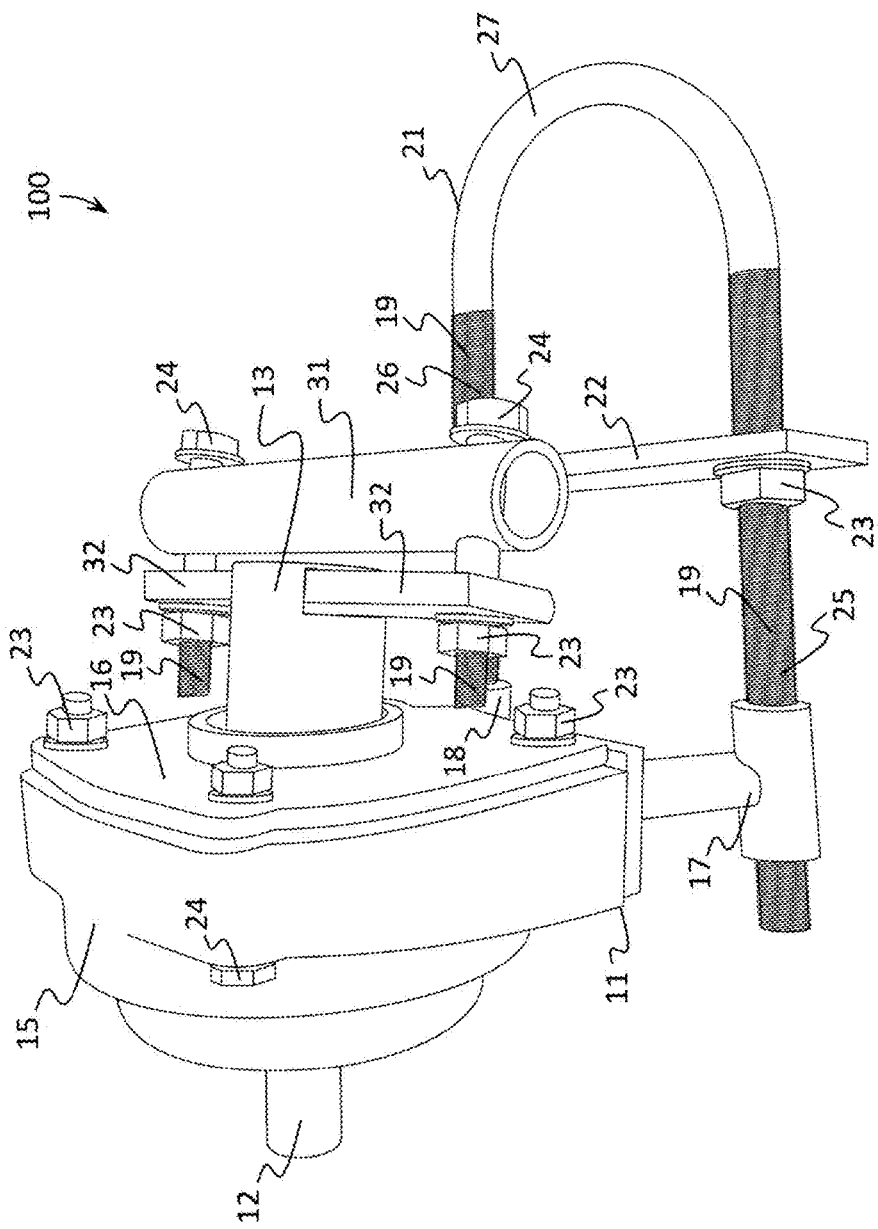
FIG. 1 depicts a perspective view of a first side of an example of a rotational coupling device according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A new adjustable object support device is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 6:
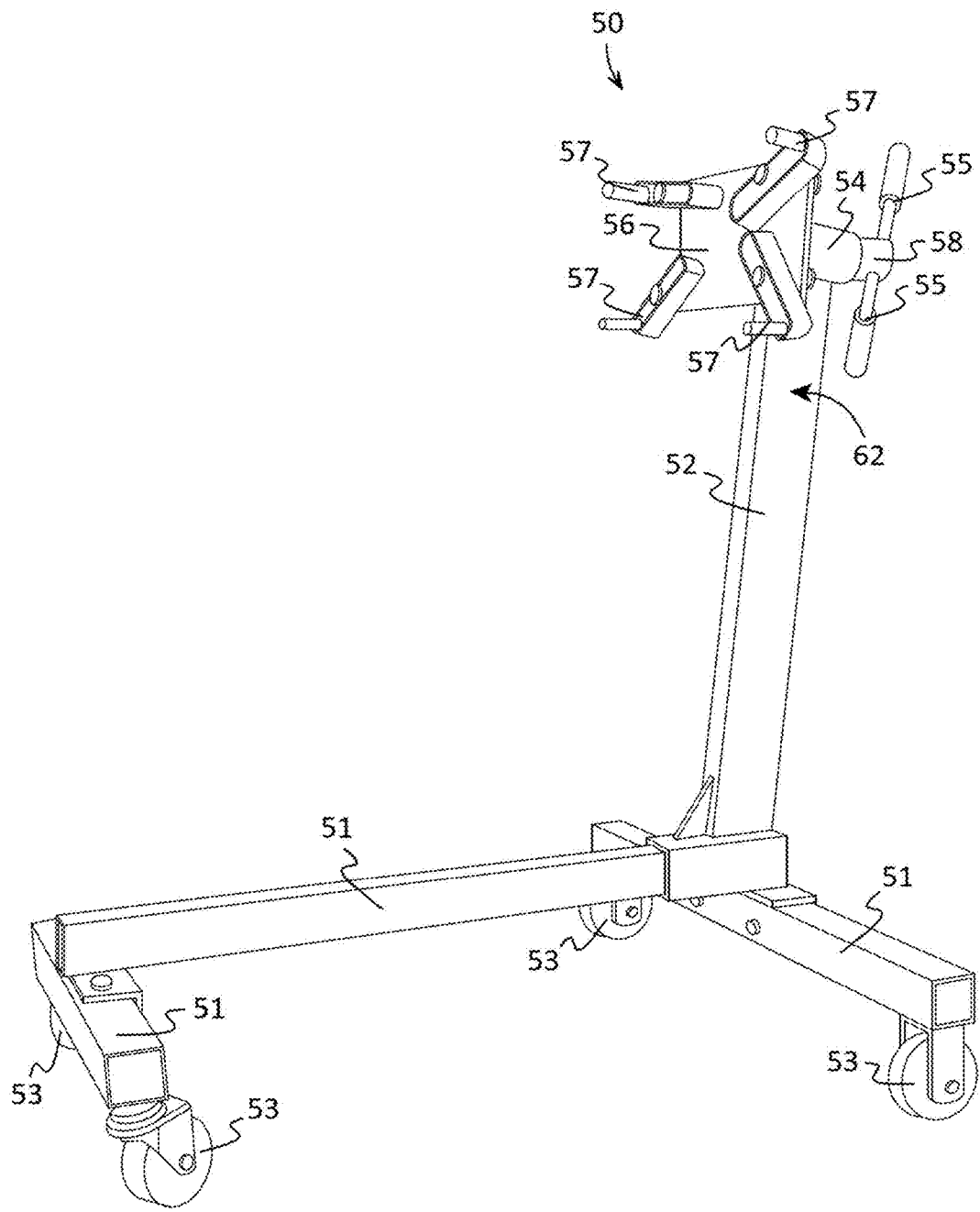
FIG. 6 shows a perspective view of an example of a machinery stand which may be used with a rotational coupling device according to various embodiments described herein.
Figure 7:
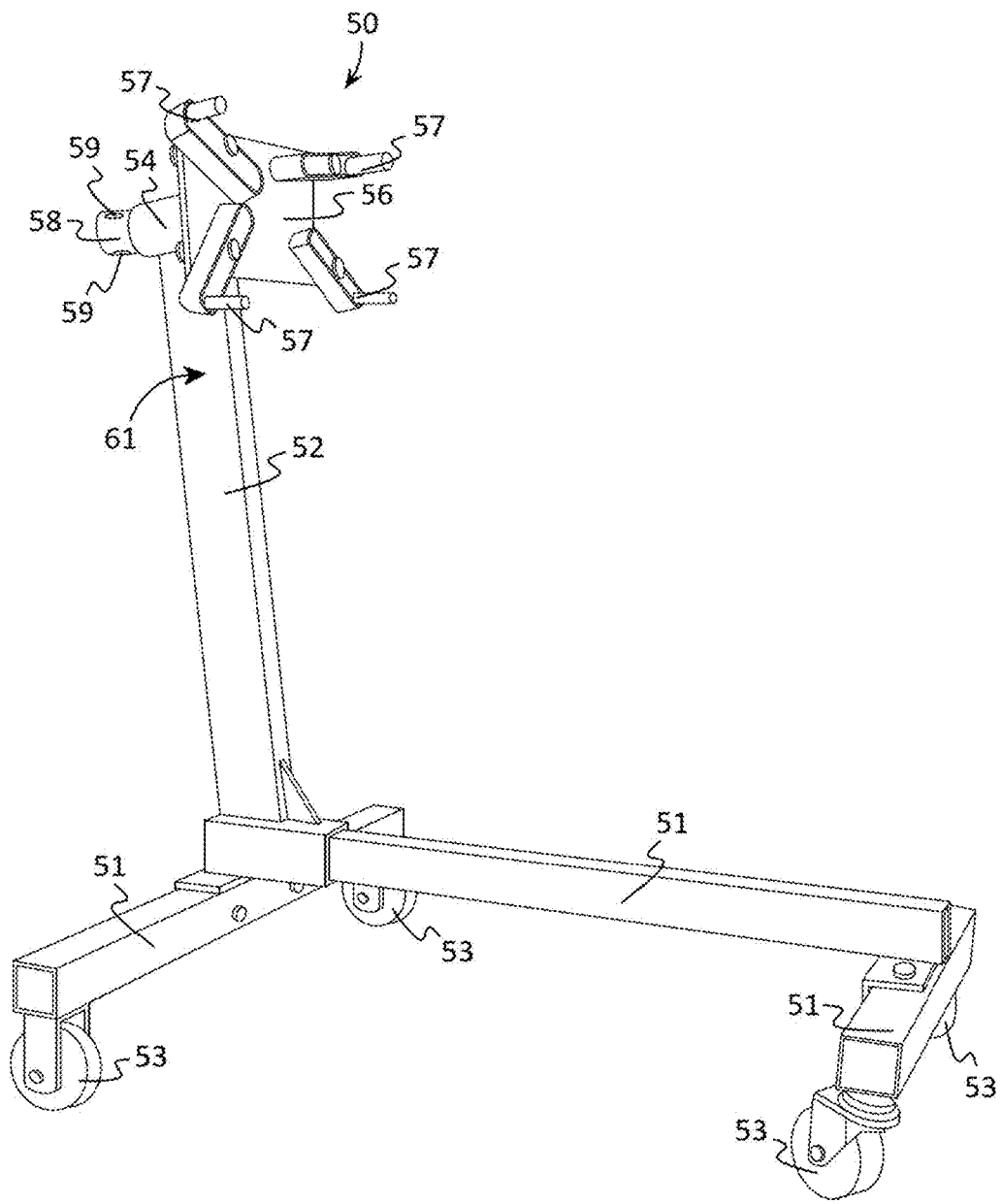
FIG. 7 depicts a perspective view of another example of a machinery stand which may be used with a rotational coupling device according to various embodiments described herein.

The present invention will now be described by example and through referencing the appended figures representing preferred and alternative embodiments. FIGS. 6 and 7 illustrate examples of a machinery stand 50 which may be used with a rotational coupling device ("the device") 100 (FIGS. 1, 2, 4, and 5) according to various embodiments. In some embodiments, the device 100 may be engaged or removably coupled to a machinery stand 50. In other embodiments, the device 100 may be integrally formed or otherwise coupled to a machinery stand 50.

Generally, a machinery stand 50 may be configured to support and position relatively large and heavy objects, such as engine blocks, manifolds, and the like. In some embodiments, a machinery stand 50 may comprise one or more horizontal frame members 51 which may be coupled to one or more vertical frame members 52. A horizontal frame member 51 may comprise or be coupled to one or more transportation conveyances 53, such as wheels, casters, treads, or the like, which may be used to facilitate the movement of the machinery stand 50 across a ground or floor surface. The frame members 51, 52, may be made from or comprise rectangular bar stock of steel alloy or any other suitably rigid material in any size and shape.

In some embodiments, one or more vertical frame members 52 may be coupled to a rotational assembly 54. The rotational assembly 54 may also be coupled to one or more stand handles 55 and to a head plate 56 or other bracket to which an object, such as an engine, may be attached. Typically, a head plate 56 may include one or more, such as four, mounting arms 57 which may be configured to receive bolts or other fasteners that may be used to secure an object to the head plate 57 and therefore to the machinery stand 50. In alternative embodiments, any other bracket or attachment mechanism may be used to couple an object to the rotational assembly 54. Rotational assemblies 54 typically comprise bearings which may enable rotational movement to be transferred between the stand handles 55 and the head plate 56 without causing the rest of the machinery stand 50 to rotate.

The one or more stand handles 55 may be coupled to the rotational assembly 54 via a handle joint 58 which may comprise one or more cylindrical handle apertures 59 into which a stand handle 55 may be coupled. Generally, once an object is secured to the head plate 56 or other mounting bracket, the user may rotate the object by rotating the stand handles 55 and the rotational motion may be transferred from the stand handles 55 to the handle joint 58 and through the rotational assembly 54 to the head plate 56 thereby rotating the object. Typically, the rotational assembly 54 transfers the rotational motion from the stand handles 55 to the head plate 56 in a one-to-one ratio which can make the rotation of large and heavy objects very difficult for the average user.

Figure 2:
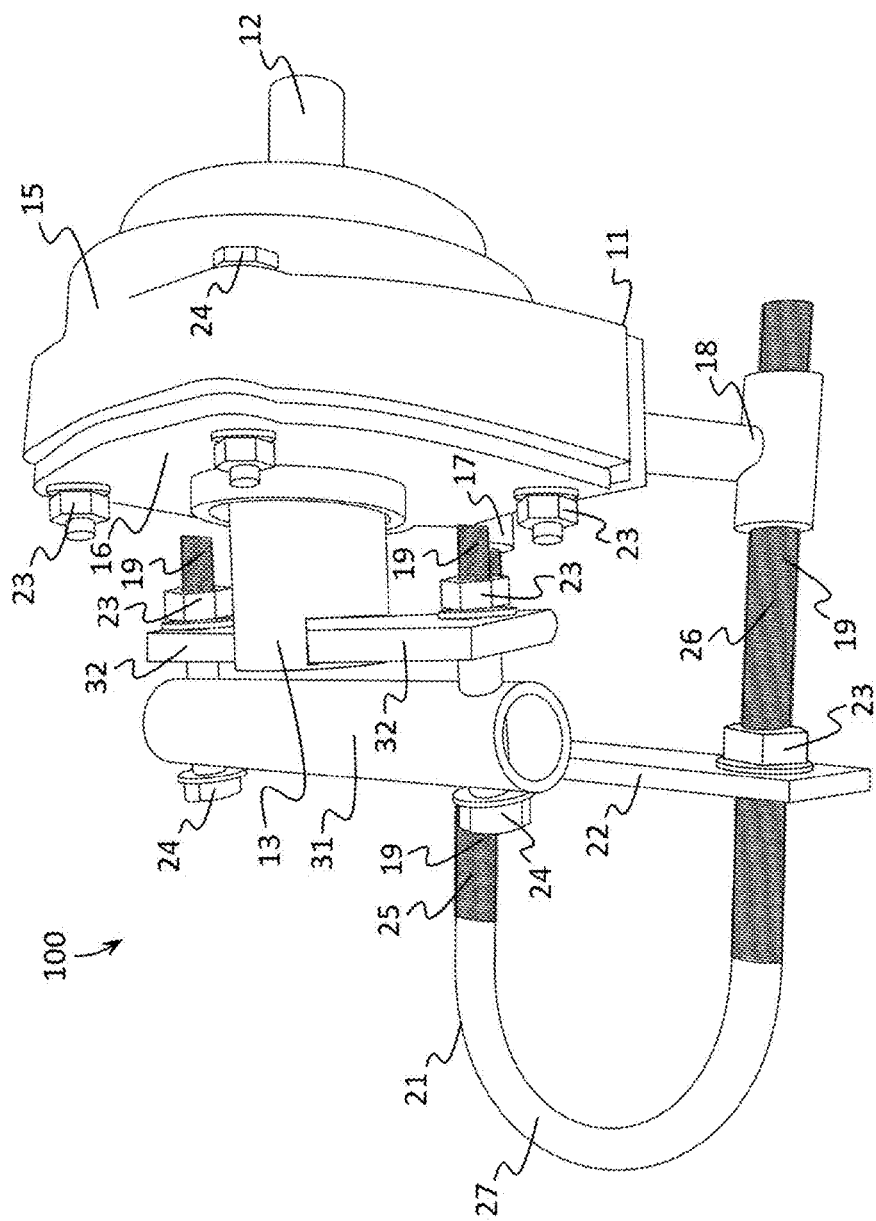
FIG. 2 illustrates a perspective view of a second side of an example of a rotational coupling device according to various embodiments described herein.
Figure 4:
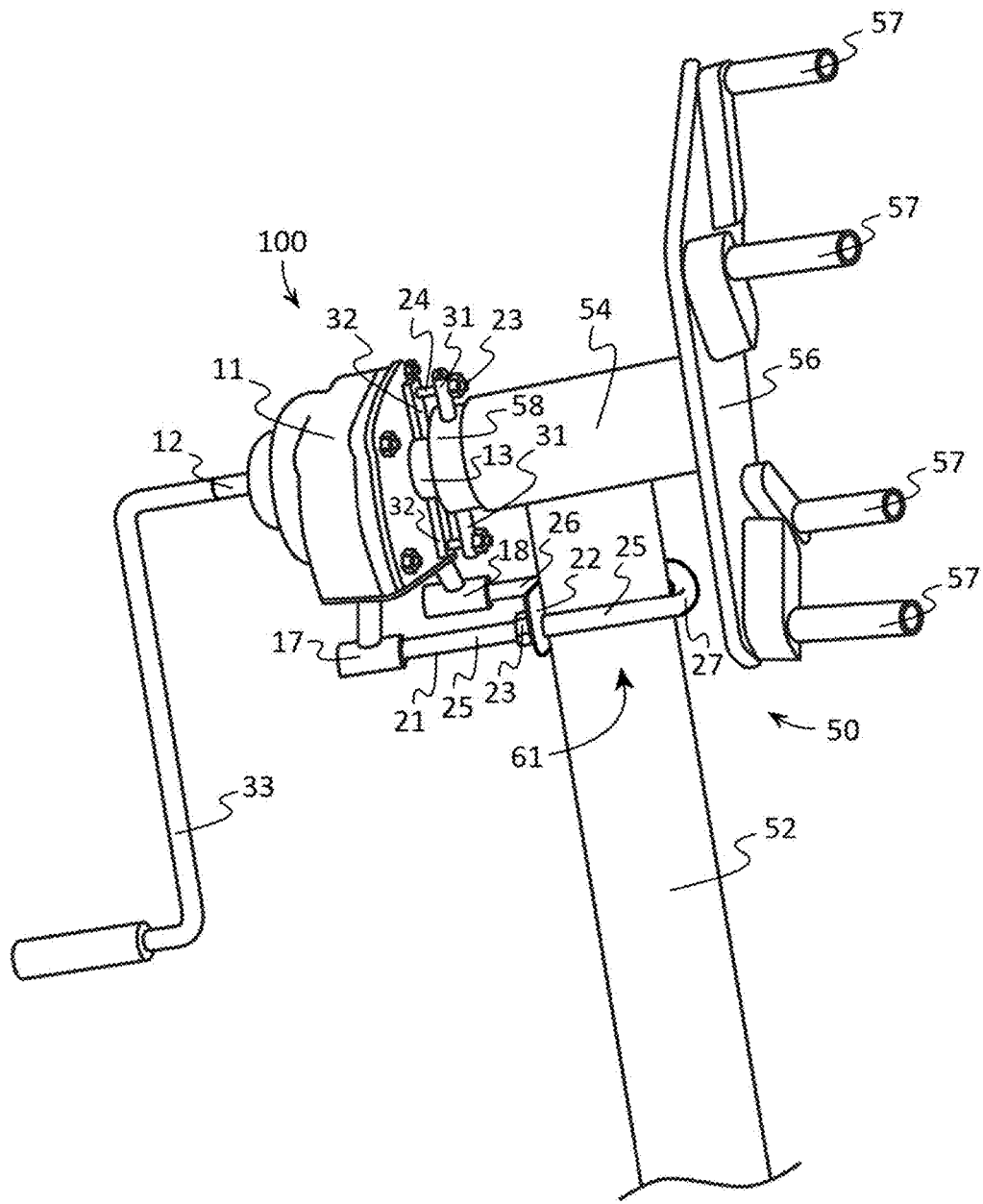
FIG. 4 depicts a perspective view of a first side of an example of a rotational coupling device engaged to a machinery stand according to various embodiments described herein.
Figure 5:
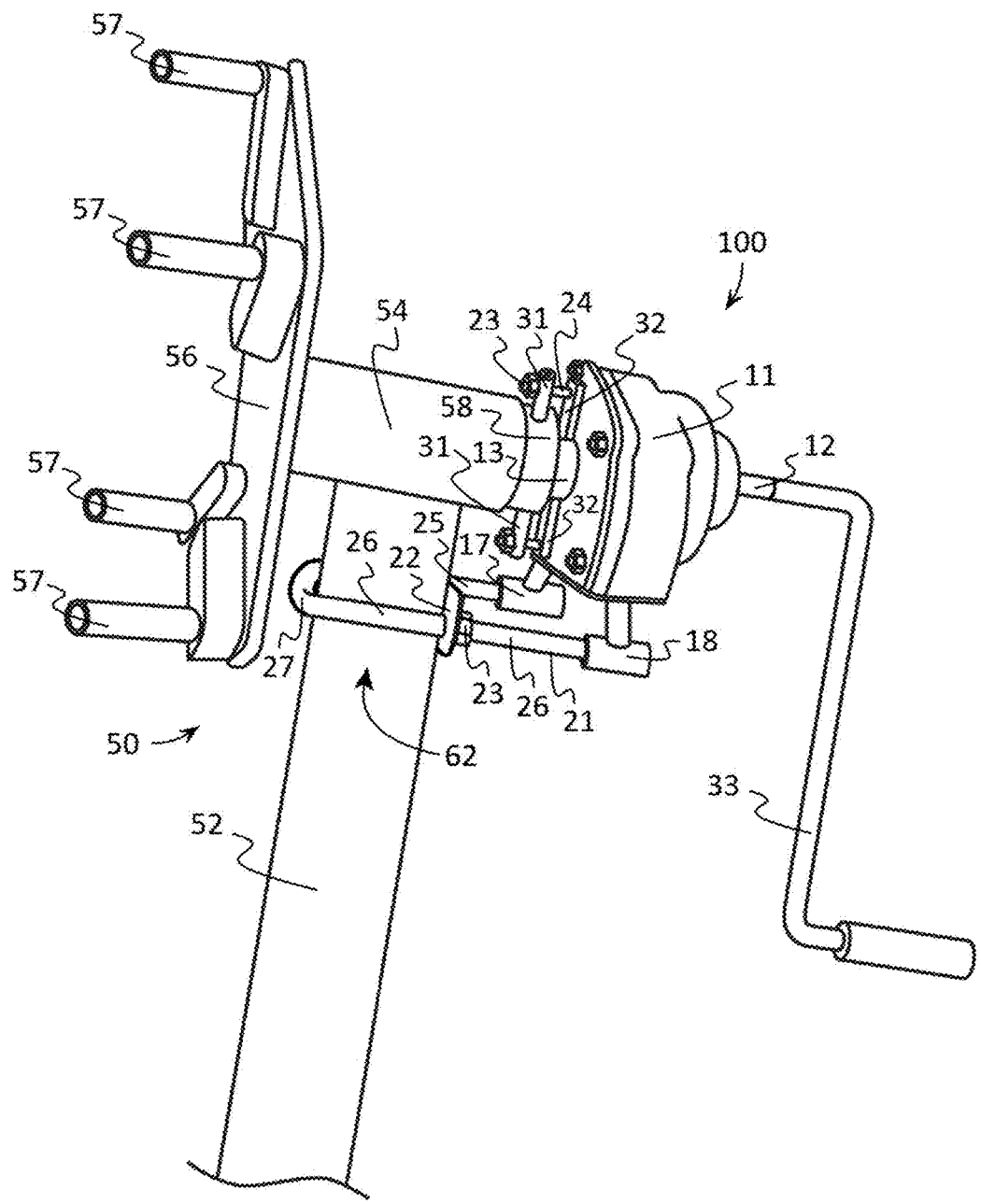
FIG. 5 illustrates a perspective view of a second side of an example of a rotational coupling device engaged to a machinery stand according to various embodiments described herein.

FIGS. 1 and 2 illustrate perspective views of an example of a rotational coupling device 100 and FIGS. 4 and 5 show perspectives view of an example of a rotational coupling device 100 engaged to an exemplary machinery stand 50 according to various embodiments described herein. The device 100 may be engaged to a machinery stand 50 to facilitate the ability of a user to rotate the head plate 56 and therefore to rotate an object coupled to the head plate 56. In some embodiments, the device 100 may comprise a housing 11 which may be coupled to a stationary coupler 21. The stationary coupler 21 may be used to engage or couple the device 100 to a frame member 51, 52, of a machinery stand 50. A motivator shaft 12 and a rotational drive shaft 13 project or extend from the housing 11. The motivator shaft 12 and the rotational drive shaft 13 may be operably connected together with a gear arrangement 40 which may be contained within the housing 11 with rotation of the motivator shaft 12 resulting in rotation of the rotational drive shaft 13. Preferably, the gear arrangement 40 may be configured as a speed reducing arrangement so that the rotational drive shaft 13 rotates with a slower rate of rotation than the motivator shaft 12. The rotational drive shaft 13 may be coupled or connected to the rotational assembly 54 via a rotational coupler 31 thereby allowing rotational motion provided by the motivator shaft 12 to be transferred through the rotational drive shaft 13 to the rotational assembly 54 of a machinery stand 50 to which the device 100 is engaged.

The housing 11 may preferably be made from steel, aluminum, or any other durable material and may be configured in any shape or size. In some embodiments, the gear arrangement 40 may be disposed within the housing 11 and may be encompassed by the housing 11 to prevent objects and other contaminants from inadvertently entering the gear arrangement 40. For example, the housing 11 may comprise a housing case 15 and a housing plate 16 which may contain the gear arrangement 40 and which may be coupled together with female fasteners 23 and male fasteners 24. In other embodiments, the housing 11 may comprise two plates between which the gear arrangement 40 may be positioned. It should be understood that a housing 11 may be configured in any size and shape.

In some embodiments, a motivator shaft 12 may be positioned on one side of the housing 11 and a rotational drive shaft 13 may be positioned on an opposing side of the housing 11. For example, when coupled to a machinery stand 50, a motivator shaft 12 may be positioned on a side of the housing 11, such as the housing case 15, distal to the machinery stand 50 and the rotational drive shaft 13 may be positioned on a side of the housing 11, such as the housing plate 16, proximal to the machinery stand 50 as shown in FIGS. 4 and 5. In other embodiments, a motivator shaft 12 may be positioned on one side of the housing 11 and a rotational drive shaft 13 may be positioned on an adjacent side of the housing 11. For example, the motivator shaft 12 and rotational drive shaft 13 may be oriented at a right angle or approximately 90 degrees relative to each other. In alternative embodiments, a motivator shaft 12 and rotational drive shaft 13 may be positioned anywhere on the housing 11.

In addition to containing the gear arrangement 40, the housing 11 may also be coupled to one or more stationary couplers 21 which may serve to maintain the position and orientation of the housing 11 relative to the machinery stand 50 while the device is conveying rotational motion to the machinery stand 50. Optionally, the structural integrity of the housing 11 may be maintained by one or more female fasteners 23 and male fasteners 24 or any other suitable coupling method.

In some embodiments, the device 100 may comprise one or more support arms, such as a first support arm 17 and a second support arm 18, which may be coupled to or otherwise engaged to one or more portions of a stationary coupler 21. The support arms 17, 18, may be coupled to the housing 11 and may extend a desired distance from the housing 11 thereby enabling the housing 11 and a stationary coupler 21 to be positioned a desired distance from each other. In preferred embodiments, one or more support arms 17, 18, may be slidably engaged to the stationary coupler 21. In further embodiments, a stationary coupler 21 may comprise one or more brace arms 25, 26, which may be slidably engaged to one or more support arms 17, 18, so that the support arms 17, 18, may be moved along portions of the length of the brace arms 25, 26. For example, a first brace arm 25 may comprise a cylindrical shape having threading 19 and a first support arm 17 may comprise a conduit having a cylindrical shape that has a diameter larger than the diameter of the threading 19 so that the first brace arm 25 may be inserted into the conduit of the first support arm 17 and slidably engaged to the first support arm 17. In other embodiments, a brace arm 25, 26, may be coupled to a support arm 17, 18, with any other coupling method which may enable the support arm 17, 18, to be reposition-ably coupled to a brace arm 25, 26. In alternative embodiments, a brace arm 25, 26, may be fixedly coupled on non-reposition-ably engaged to a support arm 17, 18.

A stationary coupler 21 may be configured to be permanently or removably coupled to a machinery stand 50 as shown in FIGS. 4 and 5. Preferably, a stationary coupler 21 may couple portions of the device 100, such as the housing 11, to the machinery stand 50 so that the stationary coupler 21 may prevent the housing 11 from rotating relative to the machinery stand 50.

In some embodiments, a stationary coupler 21 may comprise one or more brace arms, such as a first brace arm 25 and a second brace arm 26, which may be configured to engage the stationary coupler 21 portions of a machinery stand 50. In some embodiments, a stationary coupler 21 may comprise a brace arm 25, 26, which may be engaged to the machinery stand 50 by inserting a portion of the brace arm 25, 26, through a portion of the machinery stand 50, such as through a vertical frame member 52. In other embodiments, a brace arm 25, 26, may be coupled to a portion of a machinery stand 50, such as to a vertical frame member 52, via one or more fasteners 24, 25, heat welding, by being integrally formed with, or with any other suitable coupling method.

In preferred embodiments, a stationary coupler 21 may comprise a first brace arm 25 and a second brace arm 26, and the first brace arm 25 and second brace arm 26 may engage opposing sides of a frame member 51, 52, such as a first surface of the frame member 61 and an opposing second surface of the frame member 62, of the machinery stand 50. In some embodiments, the first brace arm 25 and second brace arm 26 may engage opposing surfaces 61, 62, or sides of a frame member 51, 52, by being placed in contact with or proximate to the frame member 51, 52. When the motivator shaft 12 and rotational drive shaft 13 are rotated in a first direction, rotation of the housing 11 may be prevented by contact between a frame member 51, 52, and a first brace arm 25. Similarly, when the motivator shaft 12 and rotational drive shaft 13 are rotated in a second direction, rotation of the housing 11 may be prevented by contact between a frame member 51, 52, and a second brace arm 26.

In some embodiments, a stationary coupler 21 may comprise a connecting arm 27 which may couple a first brace arm 25 and a second brace arm 26 together. While in some embodiments the brace arms 25, 26, may be generally linear and a connecting arm 27 may be generally curved or U-shaped, in other embodiments, a first brace arm 25, second brace arm 26, and/or a connecting arm 27 may be generally linear, curved, or configured with any other shape. Preferably, a first brace arm 25, second brace arm 26, and/or a connecting arm 27 may comprise threading 19 which may be used to threadedly engage or couple threaded fasteners, such as a female fastener 23.

In further embodiments, the device 100 may comprise a mounting plate 22 which may be positioned on one or more brace arms 25, 26, such as by inserting a portion of a brace arm 25, 26, through a complementary shaped aperture in the mounting plate 22, so that the mounting plate 22 may be movably coupled to the one or more brace arms 25, 26. In preferred embodiments, a mounting plate 22 may be movably coupled to a first brace arm 25 and to a second brace arm 26, and the position of the mounting plate 22 may be governed by female fasteners 23 which may be threadedly engaged to each brace arms 25, 26. The stationary coupler 21 may be engaged to a vertical frame member 52 by positioning the vertical frame member 52 between the two brace arms 25, 26, and between the mounting plate 22 and connecting arm 27. A threaded female fastener 23, such as a nut, may be threaded onto each brace arm 25, 26, to tension the mounting plate 22 towards and into contact with the portion of the vertical frame member 52 between it and the connecting arm 27 thereby clamping or frictionally retaining the stationary coupler 21 to the vertical frame member 52.

In preferred embodiments, a stationary coupler 21 may comprise a U-bolt, and the housing 11 may comprise one or more support arms 17, 18, which may be configured to slidably receive portions of the brace arms 25, 26, of the stationary coupler 21. The U-bolt type of stationary coupler 21 may be positioned around a portion of a machinery stand 50 that is proximate to the rotational assembly 54, such as a vertical frame member 52, and then engaged to the machinery stand 50 by tensioning a mounting plate 22 against the rotational assembly 54 with one or more threaded female fasteners 23 or any other suitable fasteners. Preferably, the support arms 17, 18, may be movably coupled to the stationary coupler 21 so that the housing 11 may be moved relative to the stationary coupler 21 to accommodate engaging the device to different sized and shaped rotational assemblies 54.

In alternative embodiments, a stationary coupler 21 may comprise any other fastener, bracket, or other connection method which may be used to prevent the housing 11 from rotating relative to a machinery stand 50 to which the device 100 is engaged. For example, a device 100 may comprise two or more stationary couplers 21 with two of the stationary couplers 21 configured as arms which are positioned on opposite sides of a vertical frame member 52. In preferred embodiments, the device 100 may comprise one or more stationary couplers 21 which may be coupled, attached, or secured to portions of a machinery stand 50 such as a vertical frame member 52.

In some embodiments, the device 100 may comprise a rotational coupler 31 which may be used to couple or connect the rotational drive shaft 13 to the rotational assembly 54 of a machinery stand 50. In further embodiments, the rotational coupler 31 may comprise a generally cylindrical shape. Preferably, portions of a cylindrically shaped rotational coupler 31 may be coupled by being inserted through the handle apertures 59 of a handle joint 58 in which the handle apertures 59 may be exposed by removing the stand handle(s) 55 of the machinery stand 50. In other embodiments, a rotational coupler 31 may comprise an elongated rectangualar prism shape, an elongated triangular prism shape, or any other shape which may be inserted through the handle apertures 59 of a handle joint 58.

In preferred embodiments, a rotational coupler 31 may be removably coupled to a rotational drive shaft 13. In some embodiments, a rotational coupler 31 may be coupled directly to a rotational drive shaft 13. In other embodiments, a rotational coupler 31 may be removably coupled to a rotational drive shaft 13 via a bracket plate 32 and one or more male fasteners 24 and female fasteners 23. A bracket plate may be configured in any shape and size, and may be made from any substantially rigid material such as steel alloys, aluminum, aluminum alloys, copper alloys, any other type of metal or metal alloy, etc. The bracket plate 32 may be coupled to the rotational drive shaft 13 and the rotational coupler 31 may be removably coupled to the bracket plate 32 with one or more male fasteners 24 and female fasteners 23. For example, a first male fastener 24, such as a bolt, may be inserted through a portion of the rotational coupler 31 and through a first plate aperture 34 of the bracket plate 32, and a second male fastener 24, may be inserted through a portion of the rotational coupler 31 and through a second plate aperture 34 of the bracket plate 32. A female fastener 23, such as a nut, may be threadedly engaged to each male fastener 24 thereby coupling the rotational coupler 31 to the rotational drive shaft 13 via the bracket plate 32.

In some embodiments, a bracket plate 32 may be rotationally coupled to a rotational drive shaft 13 by inserting portions of the rotational drive shaft 13 into the bracket plate 32. For example, the bracket plate 32 may comprise a shaft aperture 35 through which portions of a rotational drive shaft 13 may be inserted or received. Preferably, the shaft aperture 35 may be rectangular prism shaped, triangular prism shaped, or any other shape that is not cylindrical and the portions of the rotational drive shaft 13 inserted or received in the shaft aperture 35 may be complementary in shape to the shaft aperture 35 so that the rotational drive shaft 13 is not able to rotate without causing the bracket plate 32 to rotate. In other embodiments, a bracket plate 32 may be rotationally coupled to a rotational drive shaft 13 with any other suitable coupling method.

Preferably, the rotational coupler 31 may be coupled or connected to the handle joint 58 of a machinery stand 50, such as by replacing the stand handles 55 on the handle joint 58 with the rotational coupler 31 so that the rotational coupler 31 may be inserted through the handle apertures 59 of the handle joint 58 of the rotational assembly 54. This allows the rotational coupler 31 to be rotationally engaged to the rotational assembly 54 of the machinery stand 50 by inserting a portion of the rotational coupler 31 through a portion of the rotational assembly 54. The rotational coupler 31 may then be coupled to the bracket plate 32 and one or more male fasteners 24 and female fasteners 23 thereby rotationally coupling the rotational coupler 31 and rotational drive shaft 13 together. In alternative embodiments, any other coupling method and/or fasteners, such as male 24 and female 23 fasteners, may be used to couple the rotational drive shaft 13 to the rotational assembly 54 of a machinery stand 50. For example, the rotational drive shaft 13 may be coupled to one or more stand handles 55 of a machinery stand 50 so that the rotational drive shaft 13 may rotate the stand handle(s) 55 which in turn may rotate the rotational assembly 54 causing an object secured to the machinery stand 50 to be rotated as well.

Figure 3:
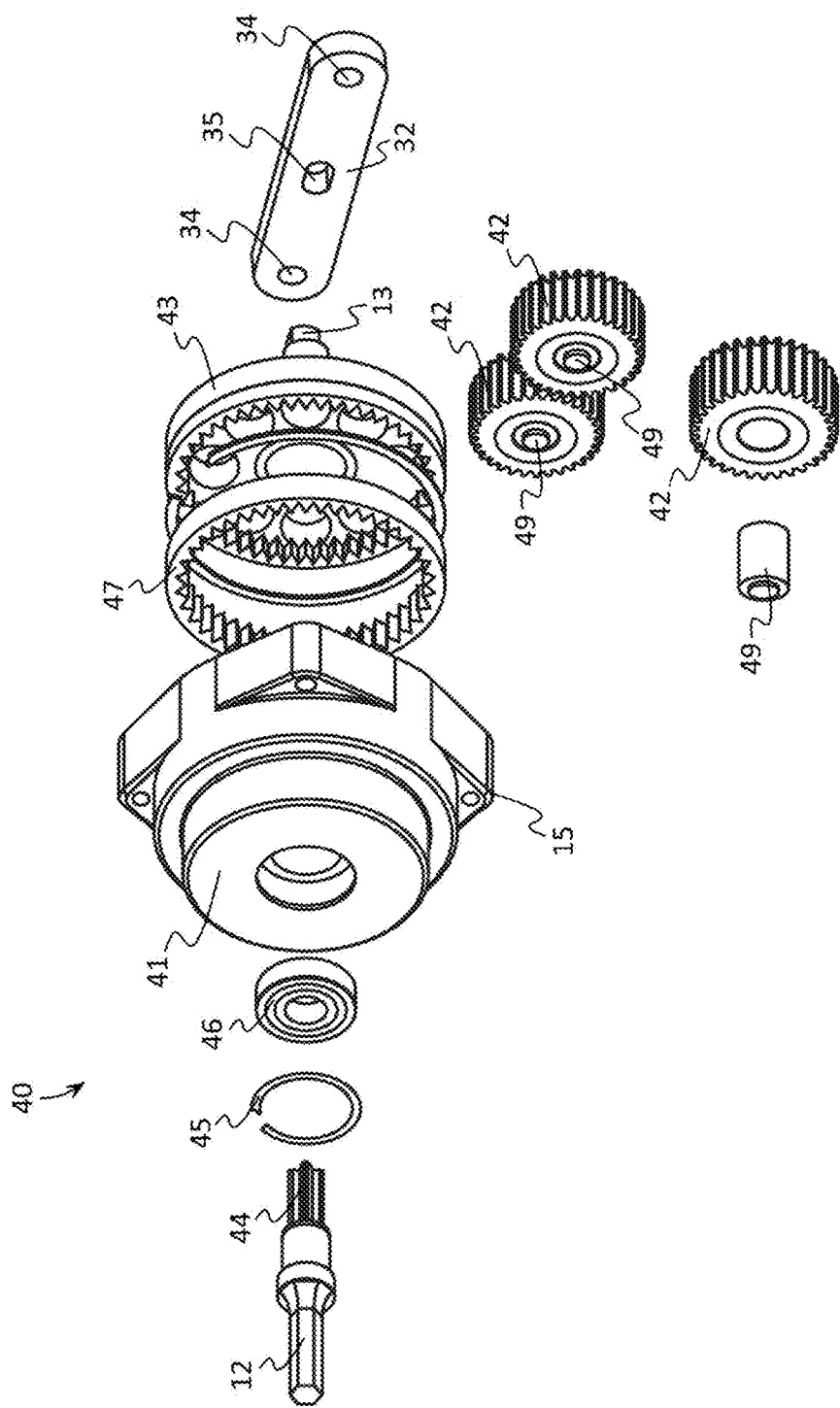
FIG. 3 shows a perspective exploded view of some example components of a gear arrangement of a rotational coupling device according to various embodiments described herein.

As perhaps best shown in FIG. 3 and in some embodiments, the motivator shaft 12 may be operably connected to the rotational drive shaft 13 with a gear arrangement 40 which may be contained within the housing 11. By being operably connected, rotation of the motivator shaft 12 may result in rotation of the rotational drive shaft 13. Preferably, the gear arrangement 40 may be configured as a speed reducing arrangement so that the rotational drive shaft 13 rotates with a slower rate or reduced rate of rotation than the motivator shaft 12 thereby giving the rotational drive shaft 13 the mechanical advantage of increasing the torque input through the motivator shaft 12.

In some embodiments, the gear arrangement 40 may be a planetary or epicyclic gear train having two or more gears mounted so that the center of one gear revolves around the center of the other. In further embodiments, a gear arrangement 40 may comprise a carrier assembly 41 which may be coupled to a portion of the housing 11, such as to the housing case 15, and which may connect the centers of the gears and rotates to carry one or more gears, called the planet gears 42, around another, called the sun gear 43. The planet gears 42 may be rotatably coupled to the carrier assembly 41 via planet gear pins 49. The planet gears 42 and sun gear 43 mesh so that their pitch circles roll without slip. A point on the pitch circle of the planet gear 42 traces an epicycloid curve. The gear arrangement 40 may also comprise a sun gear pin 44 coupled to the motivator shaft 12. A smaller snap ring 45 and ball bearing 46 may movably couple the motivator shaft 12 to the housing 11. The gear arrangement 40 may further comprise a ring gear 47 and an accompanying larger snap ring. The rotational drive shaft 13 may be coupled to the sun gear 43, and the gear arrangement 40 may be configured to transfer rotational motion between by the motivator shaft 12 and the rotational drive shaft 13.

In alternative embodiments, a gear arrangement 40 may comprise any other gearing arrangement, such as a worm drive, a parallel gear arrangement, spur gear arrangement, helical gear arrangement, rack and pinion gear arrangement, herringbone gear arrangement, intersecting bevel gear arrangement, non-intersecting and non-parallel gear arrangement, drive belt gear arrangement, drive chain gear arrangement, or any other suitable mechanical system which may be used to transfer rotational motion from a motivator shaft 12 to a rotational drive shaft 13 that are coupled or connected to the gear arrangement 40.

In some embodiments and as shown in FIGS. 4 and 5, a crank handle 33 may be coupled to the motivator shaft 12 which may be grasped and turned by a user in a cranking motion in order to rotate the motivator shaft 12. In further embodiments, any suitable type of handle, such as a crank wheel or ship's wheel, handle bar, or the like, may be coupled to the motivator shaft 12 which may be moved or manipulated by a user in order to rotate the motivator shaft 12. In still further embodiments, the motivator shaft 12 may be configured to be engaged or coupled to an electric drill, pneumatic drill, or any other common hand operated tool which may be able to provide rotational motion to the motivator shaft 12. In still further embodiments, an electric, pneumatic, or other type of motor may be coupled or connected to the motivator shaft 12 to provide rotational motion to the motivator shaft 12.

While some materials have been provided, in other embodiments, the elements that comprise the device 100 such as the housing 11, gear arrangement 40, motivator shaft 12, rotational drive shaft 13, stationary coupler 21, rotational coupler 31, optional support arms 17, 18, optional mounting plate 22, optional bracket plate 32, and/or any other element discussed herein may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A rotational coupling device configured for use with a machinery stand having a rotational assembly coupled to a frame member, and a handle joint shaft extending through the rotational assembly, the device comprising:
   a housing coupled to a stationary coupler, wherein the stationary coupler is positioned below the housing and is configured to engage the device to the frame member of the machinery stand, wherein the stationary coupler comprises a first brace arm and a second brace arm, and wherein the first brace arm is configured to engage a first surface of the frame member and the second brace arm is configured to engage an opposing second surface of the frame member of the machinery stand;
   a motivator shaft projecting from the housing;
   a rotational drive shaft projecting from the housing, wherein the motivator shaft and the rotational drive shaft are operably connected together with a gear arrangement, and wherein rotation of the motivator shaft results in rotation of the rotational drive shaft; and
   a rotational coupler configured to couple the rotational drive shaft to the handle joint shaft of the machinery stand, wherein rotational motion provided by the motivator shaft is configured to be transferred through the rotational drive shaft to the handle joint shaft of the machinery stand to which the device is engaged; and
   a bracket plate extending substantially perpendicularly through the rotational drive shaft and coupling the rotational coupler to the rotational drive shaft.

2. The device of claim 1, wherein the motivator shaft is positioned on one side of the housing and the rotational drive shaft is positioned on an opposing side of the housing.

3. The device of claim 1, wherein the rotational coupler comprises a cylindrical shape.

4. The device of claim 1, wherein the rotational coupler is removably coupled to the bracket plate.

5. The device of claim 1, wherein the housing is coupled to the stationary coupler via a support arm, and wherein the support arm is slidably engaged to the stationary coupler.

6. The device of claim 1, wherein the stationary coupler comprises a U-bolt.

7. The device of claim 1, wherein the motivator shaft is coupled to a crank handle.

* * * * *